(12) United States Patent
Mitsuhashi

(10) Patent No.: US 8,176,426 B2
(45) Date of Patent: May 8, 2012

(54) IMAGE REPRODUCTION APPARATUS AND IMAGE REPRODUCTION PROGRAM PRODUCT

(75) Inventor: Setsu Mitsuhashi, Setagaya-ku (JP)

(73) Assignee: Nikon Corporation, Tokyo (JP)

( * ) Notice: Subject to any disclaimer, the term of this patent is extended or adjusted under 35 U.S.C. 154(b) by 1171 days.

(21) Appl. No.: 11/235,050

(22) Filed: Sep. 27, 2005

(65) Prior Publication Data

US 2006/0069999 A1   Mar. 30, 2006

(30) Foreign Application Priority Data

Sep. 29, 2004 (JP) ................................. 2004-284034
Sep. 2, 2005 (JP) ................................. 2005-255206

(51) Int. Cl.
*G06F 3/00* (2006.01)
*G06F 3/048* (2006.01)

(52) U.S. Cl. ......... 715/730; 715/731; 715/732; 386/285

(58) Field of Classification Search .......... 715/730–732; 345/473; 386/285

See application file for complete search history.

(56) References Cited

U.S. PATENT DOCUMENTS

| | | | | |
|---|---|---|---|---|
| 5,500,936 A * | 3/1996 | Allen et al. | ................... | 715/808 |
| 5,572,639 A * | 11/1996 | Gantt | ............................. | 345/651 |
| 5,717,848 A * | 2/1998 | Watanabe et al. | ............. | 345/474 |
| 5,805,733 A * | 9/1998 | Wang et al. | .................... | 382/232 |
| 6,091,427 A * | 7/2000 | Boezeman et al. | ........... | 345/474 |
| 6,111,590 A * | 8/2000 | Boezeman et al. | ........... | 345/474 |
| 6,337,917 B1 * | 1/2002 | Onural et al. | ................. | 382/107 |
| 6,369,835 B1 * | 4/2002 | Lin | ............................... | 715/726 |
| 6,396,500 B1 * | 5/2002 | Qureshi et al. | ................ | 345/473 |
| 6,414,696 B1 * | 7/2002 | Ellenby et al. | ................ | 715/762 |
| 6,587,119 B1 * | 7/2003 | Anderson et al. | ............. | 345/672 |
| 6,697,569 B1 * | 2/2004 | Gomez et al. | ................. | 386/120 |
| 6,717,591 B1 * | 4/2004 | Fiveash et al. | ................ | 715/732 |
| 6,829,384 B2 * | 12/2004 | Schneiderman et al. | ...... | 382/154 |
| 6,836,870 B2 * | 12/2004 | Abrams | ....................... | 715/730 |
| 6,930,687 B2 * | 8/2005 | Grosvenor et al. | ........... | 345/473 |
| 6,961,912 B2 * | 11/2005 | Aoki et al. | .................... | 715/863 |
| 6,985,172 B1 * | 1/2006 | Rigney et al. | ................. | 348/149 |
| 6,989,848 B2 * | 1/2006 | Lipsky et al. | ................. | 345/671 |
| 7,050,072 B2 * | 5/2006 | Lipsky et al. | ................. | 345/672 |
| 7,102,643 B2 * | 9/2006 | Moore et al. | .................. | 345/473 |
| 7,372,991 B2 * | 5/2008 | Chen et al. | .................... | 382/173 |
| 7,454,077 B1 * | 11/2008 | MacKenzie et al. | .......... | 382/250 |

(Continued)

FOREIGN PATENT DOCUMENTS

EP   1 489 829 A2   12/2004

(Continued)

OTHER PUBLICATIONS

"What is Exif Print?"; CIPA; 2003; http://www.cipa.jp/exifprint/contents_e/01exif1_e.html.

(Continued)

*Primary Examiner* — Steven B Theriault
(74) *Attorney, Agent, or Firm* — Oliff & Berridge, PLC

(57) ABSTRACT

An image reproduction apparatus that sequentially reproduces and displays a plurality of images, includes: a display effect setting unit that sets a display effect for each image based upon image data of the image stored in a storage means; and a display unit that reproduces and displays the image with the display effect set by the display effect setting unit when sequentially reproducing and displaying the plurality of images.

15 Claims, 9 Drawing Sheets

U.S. PATENT DOCUMENTS

| | | | |
|---|---|---|---|
| 7,469,054 B2 * | 12/2008 | Aratani et al. | 382/118 |
| 7,505,051 B2 * | 3/2009 | Wang | 345/660 |
| 7,564,994 B1 * | 7/2009 | Steinberg et al. | 382/118 |
| 7,587,068 B1 * | 9/2009 | Steinberg et al. | 382/118 |
| 7,711,241 B2 * | 5/2010 | Mori et al. | 386/285 |
| 2002/0028026 A1 * | 3/2002 | Chen et al. | 382/284 |
| 2002/0164151 A1 * | 11/2002 | Jasinschi et al. | 386/69 |
| 2003/0071904 A1 | 4/2003 | Karasaki et al. | |
| 2003/0095197 A1 * | 5/2003 | Wheeler et al. | 348/241 |
| 2003/0108338 A1 * | 6/2003 | Nonomura et al. | 386/95 |
| 2003/0160814 A1 * | 8/2003 | Brown | 345/732 |
| 2004/0054542 A1 * | 3/2004 | Foote et al. | 704/500 |
| 2004/0091232 A1 * | 5/2004 | Appling, III | 386/46 |
| 2004/0130566 A1 * | 7/2004 | Banerjee et al. | 345/716 |
| 2004/0218894 A1 * | 11/2004 | Harville et al. | 386/46 |
| 2004/0223747 A1 * | 11/2004 | Otala et al. | 386/125 |
| 2004/0263664 A1 * | 12/2004 | Aratani et al. | 348/333.12 |
| 2004/0264939 A1 * | 12/2004 | Hua et al. | 386/96 |
| 2005/0068339 A1 * | 3/2005 | Lipsky et al. | 345/661 |
| 2005/0084136 A1 * | 4/2005 | Xie et al. | 382/107 |
| 2005/0088442 A1 | 4/2005 | Ota | |
| 2005/0091579 A1 * | 4/2005 | Mewherter et al. | 715/513 |
| 2005/0231602 A1 * | 10/2005 | Obrador et al. | 348/208.14 |
| 2009/0067730 A1 * | 3/2009 | Schneiderman | 382/224 |
| 2010/0014721 A1 * | 1/2010 | Steinberg et al. | 382/118 |

FOREIGN PATENT DOCUMENTS

| | | |
|---|---|---|
| JP | A-6-98255 | 4/1994 |
| JP | A-11-243484 | 9/1999 |
| JP | A-11-308513 | 11/1999 |
| JP | A-2001-94924 | 4/2001 |
| JP | A-2001-186297 | 7/2001 |
| JP | A-2003-108979 | 4/2003 |
| JP | A-2003-125251 | 4/2003 |
| JP | A-2003-143444 | 5/2003 |
| JP | A-2003-209809 | 7/2003 |
| JP | A-2004-110821 | 4/2004 |
| JP | A-2005-12674 | 1/2005 |
| JP | A-2005-56390 | 3/2005 |
| JP | A-2005-182196 | 7/2005 |
| JP | A-2005-354332 | 12/2005 |
| JP | A-2005-354333 | 12/2005 |
| JP | A-2006-54523 | 2/2006 |
| WO | WO 03/073756 A1 | 9/2003 |

OTHER PUBLICATIONS

Office Action issued in Japanese Patent Application No. 2005-255206 on Mar. 23, 2010 (with English-Language Translation).

* cited by examiner

SHIFTING DIRECTION

IMAGE REPRODUCTION APPARATUS AND IMAGE REPRODUCTION PROGRAM PRODUCT

INCORPORATION BY REFERENCE

The disclosures of the following priority applications are herein incorporated by reference:
Japanese Patent Application No. 2004-284034 filed Sep. 29, 2004
Japanese Patent Application No. 2005-255206 filed Sep. 2, 2005

BACKGROUND OF THE INVENTION

1. Field of the Invention

The present invention relates to an image reproduction apparatus and an image reproduction program product that may be adopted when reproducing an image.

2. Description of Related Art

Japanese Laid Open Patent Publication No. 2003-209809 of the known art discloses an image reproduction apparatus that shows only specific images in a slide show display as desired by excluding images that the user does not wish to be displayed.

SUMMARY OF THE INVENTION

This apparatus in the related art, which simply displays still images in sequence, gives rise to a problem in that the user may find it tedious to continuously view images over an extended period of time.

The present invention is characterized in that a display effect for each of a plurality of images to be sequentially reproduced and displayed is set based upon image data of each image stored in a storage device and each image is reproduced and displayed based upon the display effect thus set.

It is desirable that during this process, the directionality of the subject present in the image be judged, a shifting direction for the image reproduced for display may be determined based upon the directionality of the subject present in the image having been judged and a shifting display of the image along the image shifting direction thus determined be selected as the display effect for the image.

In addition, a focus position in the image may be ascertained and zoom-in and/or zoom-out relative to a subject present at the ascertained focus position may be selected as the display effect for the image. Alternatively, a person's face present in the image may be detected, the face may then be ascertained as a main subject and zoom-in and/or zoom-out relative to the ascertained main subject may be selected as the display effect for the image.

As a further alternative, a subject present in the image at a closest position may be identified as the main subject, or the focus distance of the image may be ascertained and a subject present at a distance closest to the determined focus distance may be identified as the main subject.

In addition, alphanumeric characters present in the image may be detected and may be identified as the main subject, the main subject may be identified in correspondence to the image photographing mode setting, or the main subject may be identified based upon a title assigned to the image.

DESCRIPTION OF PREFERRED EMBODIMENT(S)

First Embodiment

Figure 1:
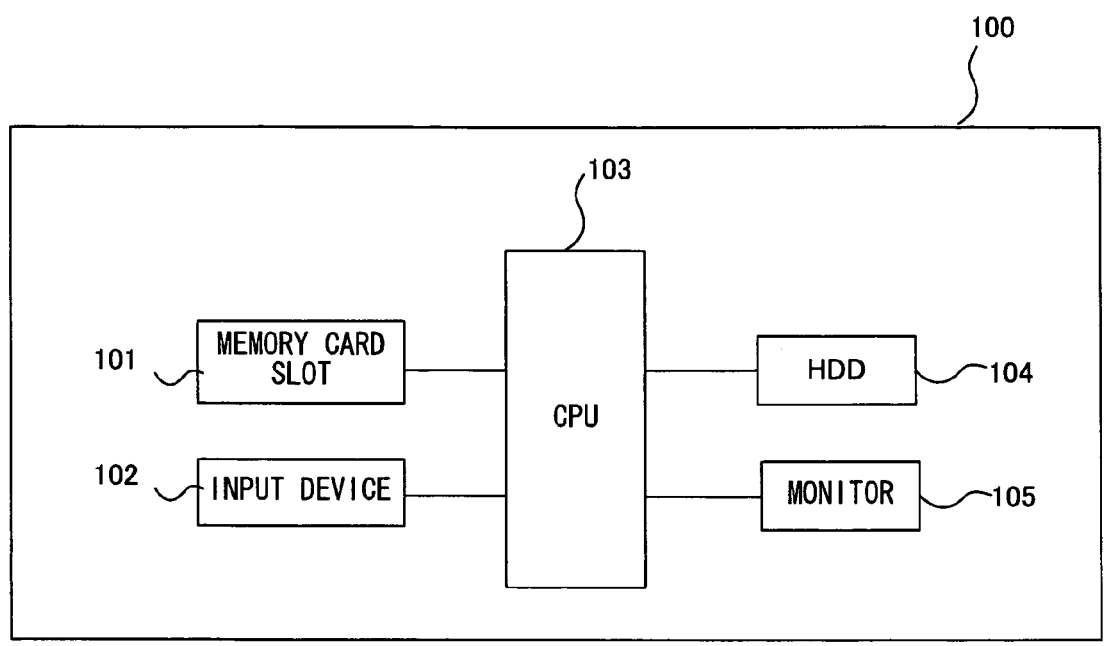
FIG. 1 shows a block diagram of the structure adopted in the image reproduction apparatus achieved in the first embodiment.

FIG. 1 is a block diagram showing the structure adopted in the first embodiment of the image reproduction apparatus. An image reproduction apparatus 100 comprises a memory card slot 101 through which image data saved in a memory card are taken in, an input device 102 operated by the user, a CPU 103 that executes an image slide show as detailed later, an HDD 104 into which the image data having been taken in and an image reproduction program to be detailed later are saved, and a monitor 105 at which images are displayed.

The CPU 103 executes a slide show with the image data stored in the HDD 104 by executing the image reproduction program read from the HDD 104 having the image reproduction program stored therein. In other words, it sequentially displays at the monitor 105 a plurality of images read from the HDD 104. At this time, a display effect for each image is set based upon the directionality of a subject present in the image. Namely, the CPU 103 detects the orientation of a subject present in each image through directionality detection processing to be detailed later and executes the slide show by shifting the image based upon the directionality of the subject thus detected.

More specifically, if the subject is detected to contain numerous horizontal edges, the subject is judged to have horizontal directionality and based upon this judgment, the image display is shifted along the lateral direction (horizontal direction) as explained later in reference to FIGS. 2A through 2C. If, on the other hand, the subject is detected to contain numerous vertical edges, the subject is judged to have vertical directionality and accordingly, the image display is shifted along the longitudinal direction (vertical direction).

Figure 2:
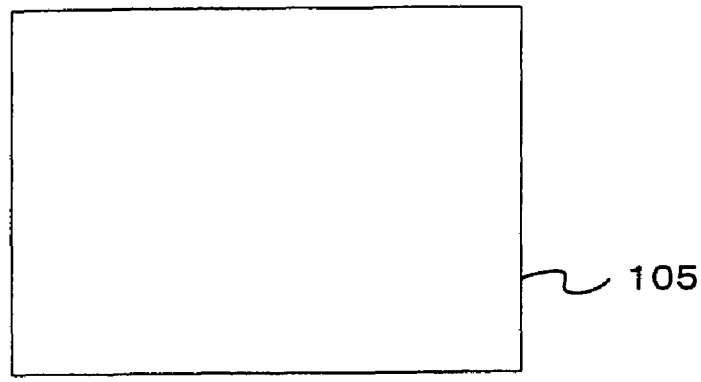
FIGS. 2A through 2C show a specific example in which a subject present in an image and having horizontal directionality is shifted along the horizontal direction for display.
Figure 2:
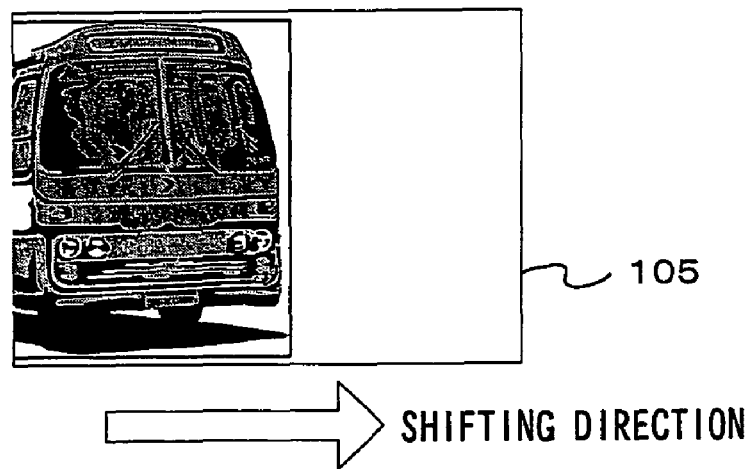
Figure 2:
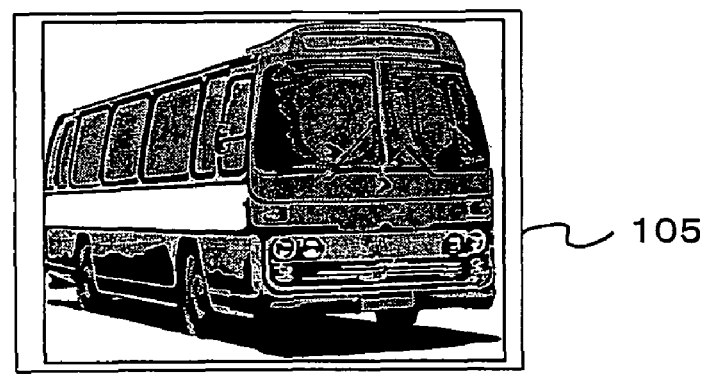

FIGS. 2A through 2C present a specific example in which an image containing a subject with horizontal directionality is shifted along the horizontal direction for display. If the image having been read is detected to contain a subject having horizontal directionality while no display is up at the monitor 105 as shown in FIG. 2A, e.g., at the start of a slide show or while awaiting the display of the next image after the display of a given image has been finished during a slide show, the image display is gradually shifted along the horizontal direction from the left to the right at the monitor 105, as shown in FIG. 2B.

Ultimately, the entire image is displayed on the screen of the monitor 105, as shown in FIG. 2C, and once a preset display time period allocated for each image elapses, the image is cleared from the monitor 105 and the monitor display returns to the state shown in FIG. 2A. Then, the next image is read and the image display is then shifted based upon the directionality of a subject present in the image. It is to be noted that while FIGS. 2A through 2C show an example in which the image is shifted along the horizontal direction from the left to the right at the monitor 105 for display, the image may instead be shifted from the right to the left. In addition, an image display may be shifted along the vertical direction, either from the top to the bottom or from the bottom to the top at the monitor 105.

Next, the directionality detection processing executed to detect the directionality of a subject present in each image is explained. It is to be noted that the directionality detection processing is executed for the next image while the current image is on display at the monitor 105 during a slide show. First, the spatial frequency is calculated by executing a two-dimensional Fourier transform over the entirety of the image being processed (target image). Then, the intensity of the spatial frequency, i.e., the power spectrum, is calculated, the direction along which the power spectrum concentrates most strongly is detected and the subject present in the image is judged to have directionality along the detected direction. It is to be noted that since the two-dimensional Fourier transform and the power spectrum calculation can be executed by adopting methods of the known art, their explanation is omitted.

If the power spectrum is distributed along multiple directions and the directionality of the subject present in a given image cannot be determined, the image display is shifted along a predetermined direction, e.g., along the horizontal direction from the left to the right, at the monitor 105. In addition, the directionality detection processing may be executed in advance prior to the slide show start and, in such a case, the directionality detected for each image may be stored in memory at a database or the like.

Figure 3:
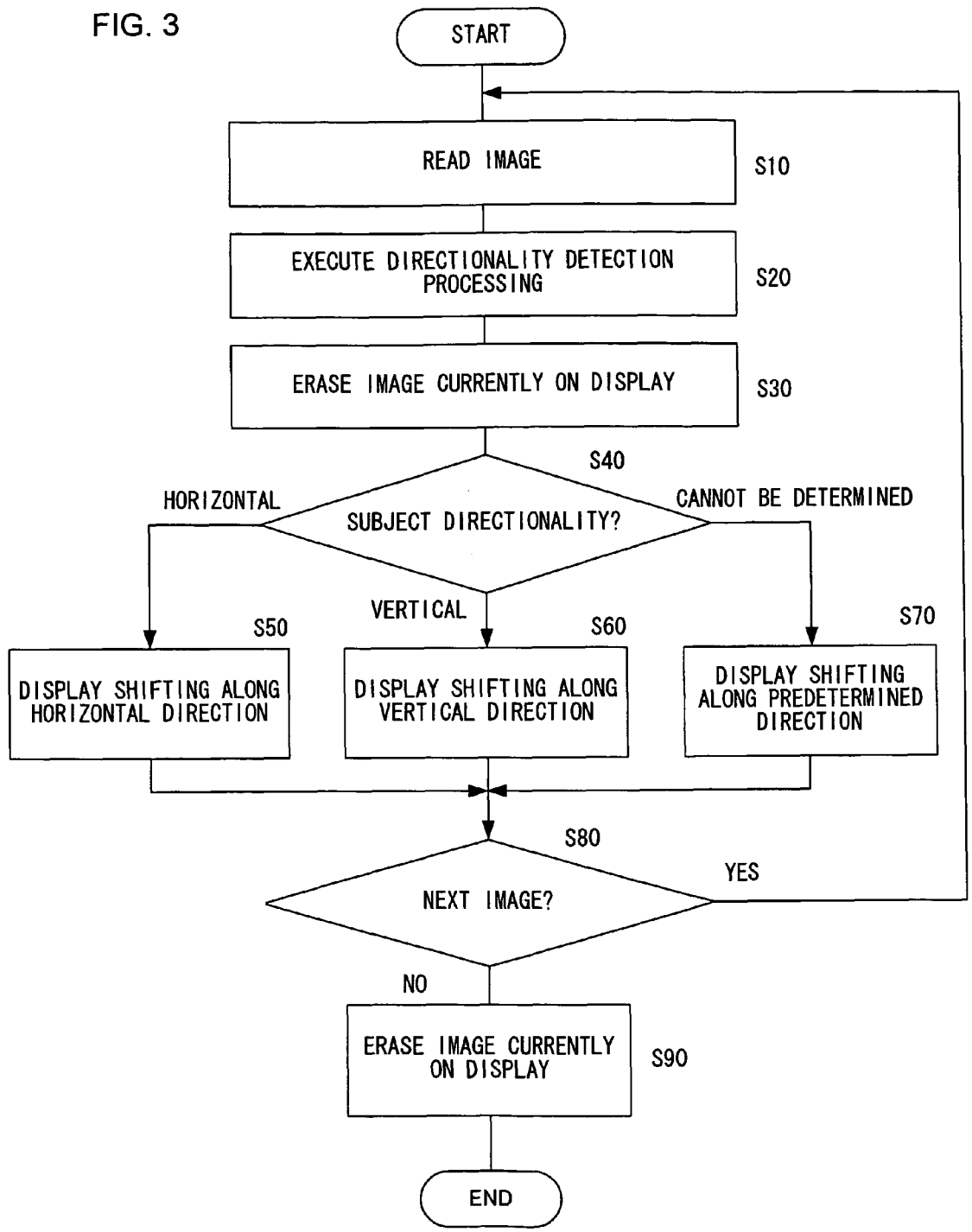
FIG. 3 shows a flowchart of the processing executed in conformance to the image reproduction program achieved in the first embodiment.

FIG. 3 presents a flowchart of the processing executed in conformance to the image reproduction program achieved in the first embodiment. The processing in FIG. 3 is executed by the CPU 103 as the user operates the input device 102 to issue an instruction for slide show execution.

In step S10, image data are read from the HDD 104, and then the operation proceeds to step S20. In step S20, the directionality detection processing described earlier is executed and the directionality of a subject present in the image is detected. Then, the operation proceeds to step S30. If an image is currently on display at the monitor 105, the preset display time period allocated for each image is allowed to elapse and then the image is cleared from the monitor 105 to clear the display at the monitor 105 in step S30.

Subsequently, the operation proceeds to step S40 to judge the directionality of the subject having been detected. If the directionality of the subject is judged to be horizontal, the operation proceeds to step S50 to display the image at the monitor 105 by shifting it along the horizontal direction. If the subject directionality is judged to be vertical, the operation proceeds to step S60 to display the image at the monitor 105 by shifting the image along the vertical direction. If, on the other hand, no subject directionality has been detected, the operation proceeds to step S70 to display the image at the monitor 105 by shifting the image along the predetermined direction.

The operation then proceeds to step S80 to make a decision as to whether or not there is another image to be displayed in the slide show. If it is decided that there is an image to be displayed next, the operation returns to step S10 to execute the processing described above for the next image. If, on the other hand, it is decided that there are no more images to be displayed, the operation proceeds to step S90. Once the image currently on display at the monitor 105 is erased in step S90 after the preset display time period allocated for each image elapses, before the processing ends.

The first embodiment described above achieves the following advantages.

(1) For a slide show display of images, the directionality of a subject present in each image is detected and images are shifted based upon the detected subject directionality for display. Since the image is shifted along the direction matching the actual directionality of the subject present in the image for display, the shifting image display that looks natural to the user is provided.

(2) In addition, unlike in a slide show in the related art in which still images are simply displayed in sequence, images can be displayed with movement, which the user is bound to find more engaging.

(3) In other words, images are reproduced and displayed sequentially based upon the display effects set for the individual images by individually analyzing the corresponding sets of image data. Since this makes it possible to display each image with an optimal display effect for the image, the user is able to continuously view images over an extended period of time without finding it tedious.

Second Embodiment

In the second embodiment, while a given image is on display at the monitor 105 during a slide show, the focus position in the image is ascertained based upon image information such as Exif information, i.e., image information indicating the photographing conditions and the like stored as part of the image data in correspondence to the particular image, and the main subject is judged to be present at this focus position. Then, the image is displayed by zooming in on the focus position and then zooming out from the focus position as the display effect. More specifically, the main subject is first displayed in an enlargement by zooming in on a subject identified at the ascertained focus position and then the initial state, i.e., the state in which the main subject is not displayed in an enlargement, is restored through zooming out. It is to be noted that since the image reproduction apparatus 100 assumes a structure similar to that of the first embodiment having been explained in reference to the block diagram in FIG. 1, its explanation is omitted.

Figure 4:
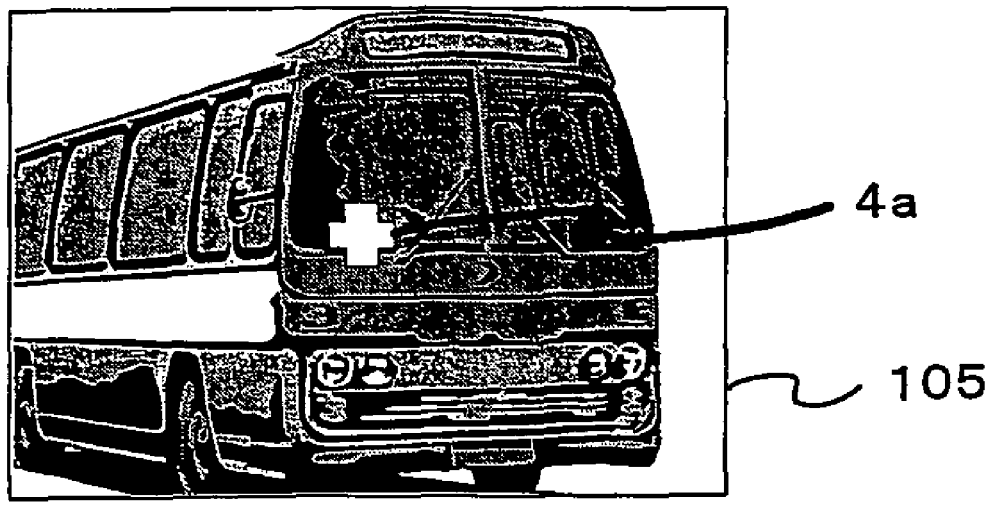
FIGS. 4A and 4B show a specific example in which zoom-in and zoom-out are executed relative to the focus position in the image.
Figure 4:
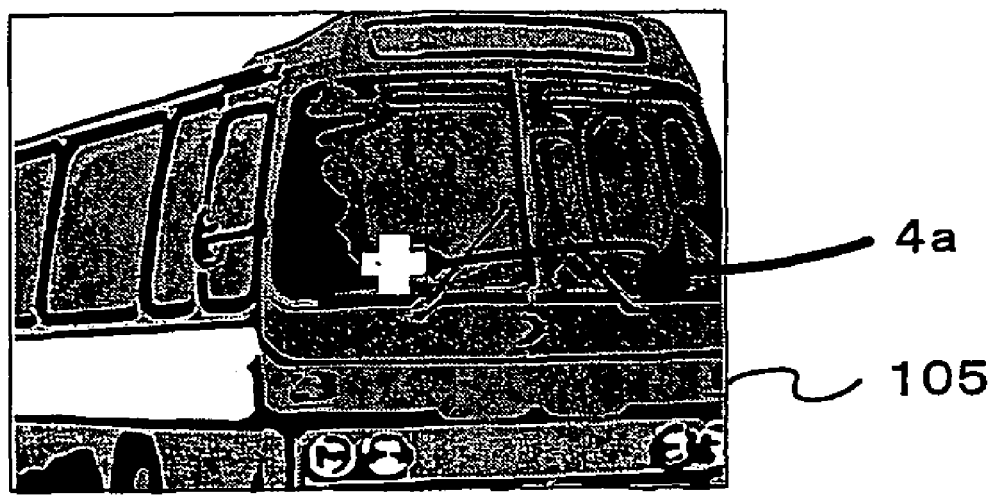

FIGS. 4A and 4B present a specific example in which an image is displayed by zooming in on the subject present at the focus position. If the focus position in the image is at the position indicated by reference numeral 4a, i.e., around the front windshield of the bus at the center of the image plane, while the image is on display at the monitor 105, as shown in FIG. 4A, a zoom-in on the focus position 4a (windshield) is executed. As a result, the image is displayed in an enlargement around the focus position 4a at the monitor 105, as shown in FIG. 4B.

Figure 5:
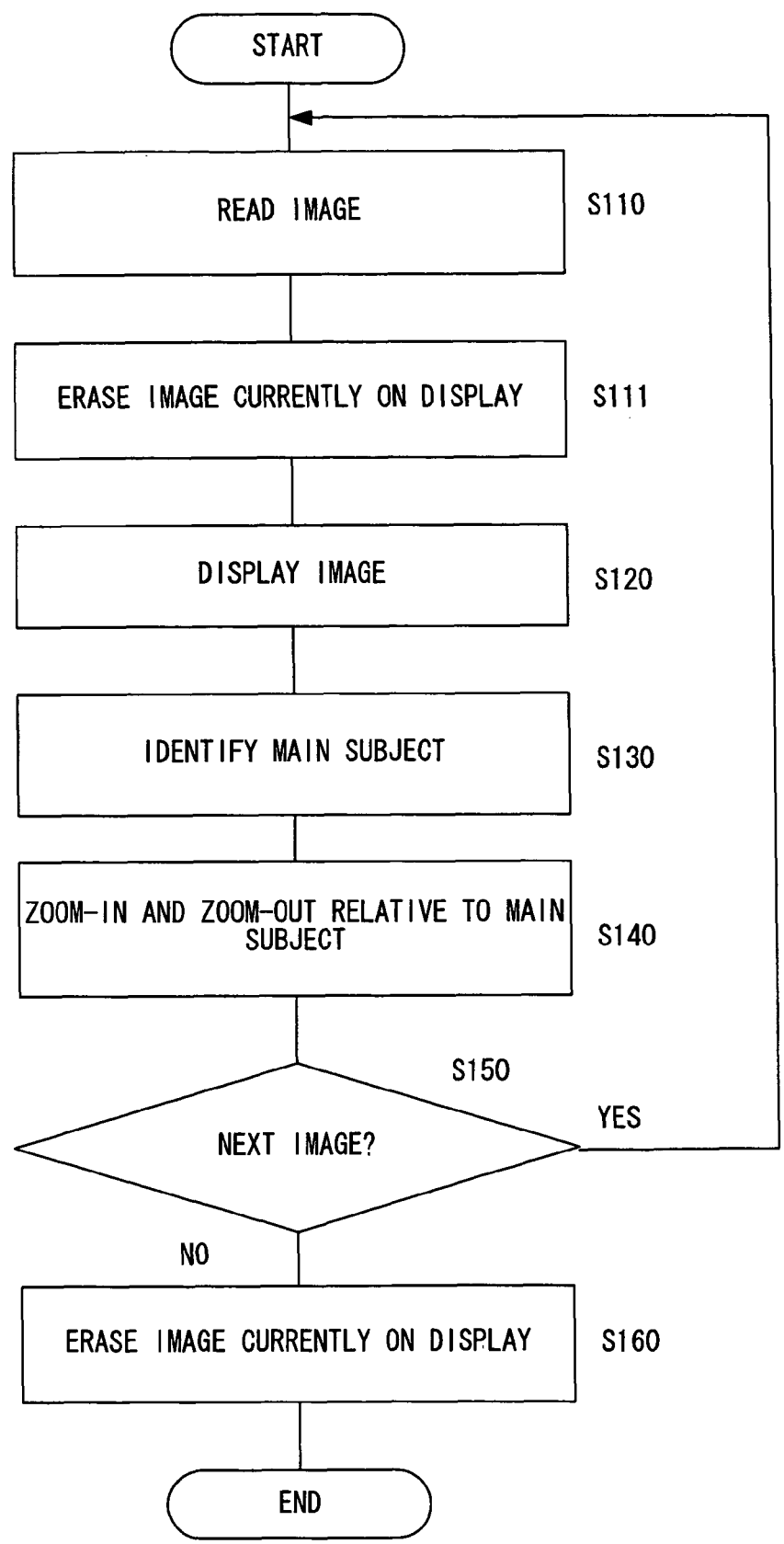
FIG. 5 shows a flowchart of the processing executed in conformance to the image reproduction program achieved in the second embodiment.

FIG. 5 presents a flowchart of the processing executed in conformance to the image reproduction program achieved in the second embodiment. The processing in FIG. 5 is executed by the CPU 103 as the user operates the input device 102 to issue an instruction for slide show execution.

In step S110, image data are read from the HDD 104, and then the operation proceeds to step S111. If an image is currently on display at the monitor 105, the preset display time period allocated for each image is allowed to elapse and then the image is cleared from the monitor 105 to clear the display at the monitor 105 in step S111. Subsequently, the operation proceeds to step S120 to display the image having been read at the monitor 105 before the operation proceeds to step S130. In step S130, a main subject in the image is identified by ascertaining a focus position in the image based upon the image information such as Exif information and judging that the main subject is present at the ascertained focus position. Then the operation proceeds to step S140.

In step S140, the main subject is displayed in an enlargement by zooming in relative to the subject present at the focus position having been ascertained, i.e., the main subject, and then the initial display state is restored through a zoom-out. Subsequently, the operation proceeds to step S150 to make a decision as to whether or not there is an image to be displayed next. If it is decided that there is another image to be displayed, the operation returns to step S110 to execute the processing described above for the next image. If, on the other hand, it is decided that there are no more images to be displayed, the operation proceeds to step S160. In step S160, the image currently on display at the monitor 105 is cleared after the preset display time period allocated for each image elapses, and then the processing ends.

The following advantages are achieved in the second embodiment explained above.
(1) A focus position in the image is ascertained based upon image information by analyzing the image data of the image, and then the image is displayed by zooming in and/or zooming out relative to the subject present at the ascertained focus position. This feature makes it possible to display the main subject in an enlargement by appropriately and accurately identifying the main subject in the image, since the main subject is highly likely to be present at the focus position in the image under normal circumstances.
(2) In addition, unlike in a slide show in the related art in which still images are simply displayed in sequence, images can be displayed with motion, which the user is bound to find more engaging.

Third Embodiment

In the second embodiment, assuming that the main subject is likely to be present at the focus position in the image the focus position in the image is ascertained based upon image information and the image is displayed by zooming in and/or zooming out relative to the subject present at the ascertained the focus position. The third embodiment differs from the second embodiment in that while a given image is on display at the monitor 105 during a slide show, the faces of any persons present in the image are detected through face recognition processing executed on the image on display by adopting the person's face recognition technology in the known art and one of the faces having been detected is identified as the main subject through main subject identification processing to be detailed later. It is to be noted that since the image reproduction apparatus 100 assumes a structure similar to that of the first embodiment having been explained in reference to the block diagram in FIG. 1, its explanation is omitted.

Now, the main subject identification processing is described. If one person's face is detected in the image through the person's face recognition processing, the person's face of the person is identified as the main subject. If, on the other hand, a plurality of faces is detected in the image, the area occupied by each of the faces having been detected in the image is calculated. Then, the person's face occupying the greatest area in the image is identified as the main subject. It is to be noted that if no face is detected in the image, the subject present at the focus position of the image is determined as the main subject, as in the second embodiment.

Figure 6:
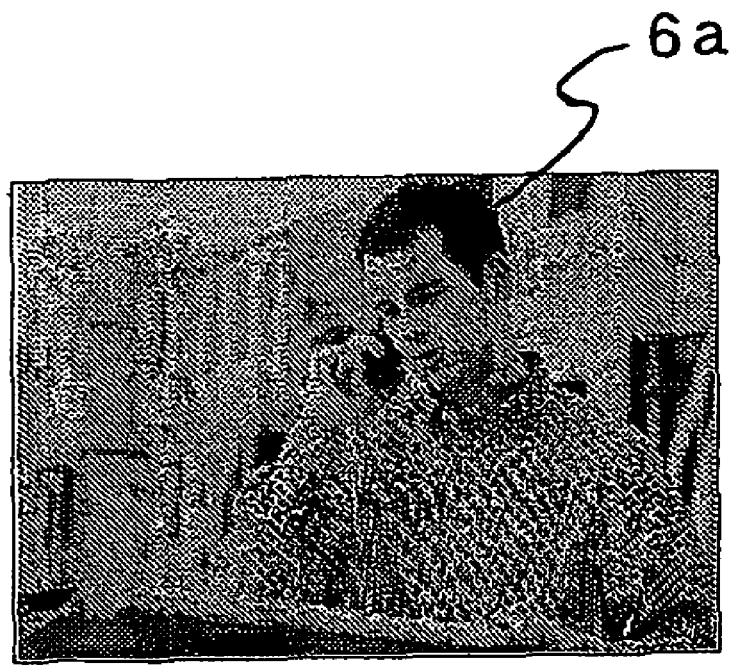
FIGS. 6A and 6B show a specific example in which zoom-in and zoom-out are executed for a person's face identified as the main subject.
Figure 6:
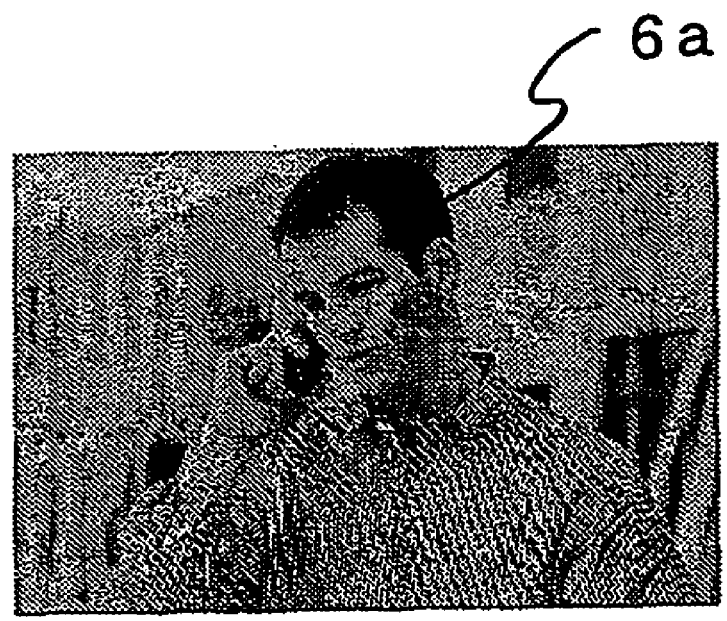

Subsequently, zoom-in and/or zoom-out relative to the main subject having been ascertained through the main subject identification processing explained above is executed as the image display effect, as in the second embodiment. For instance, if a person's face 6*a* is identified as the main subject in the image shown in FIG. 6A through the main subject identification processing, a zoom-in relative to the identified main subject, i.e., the person's face 6*a* is executed as shown in FIG. 6B.

Figure 7:
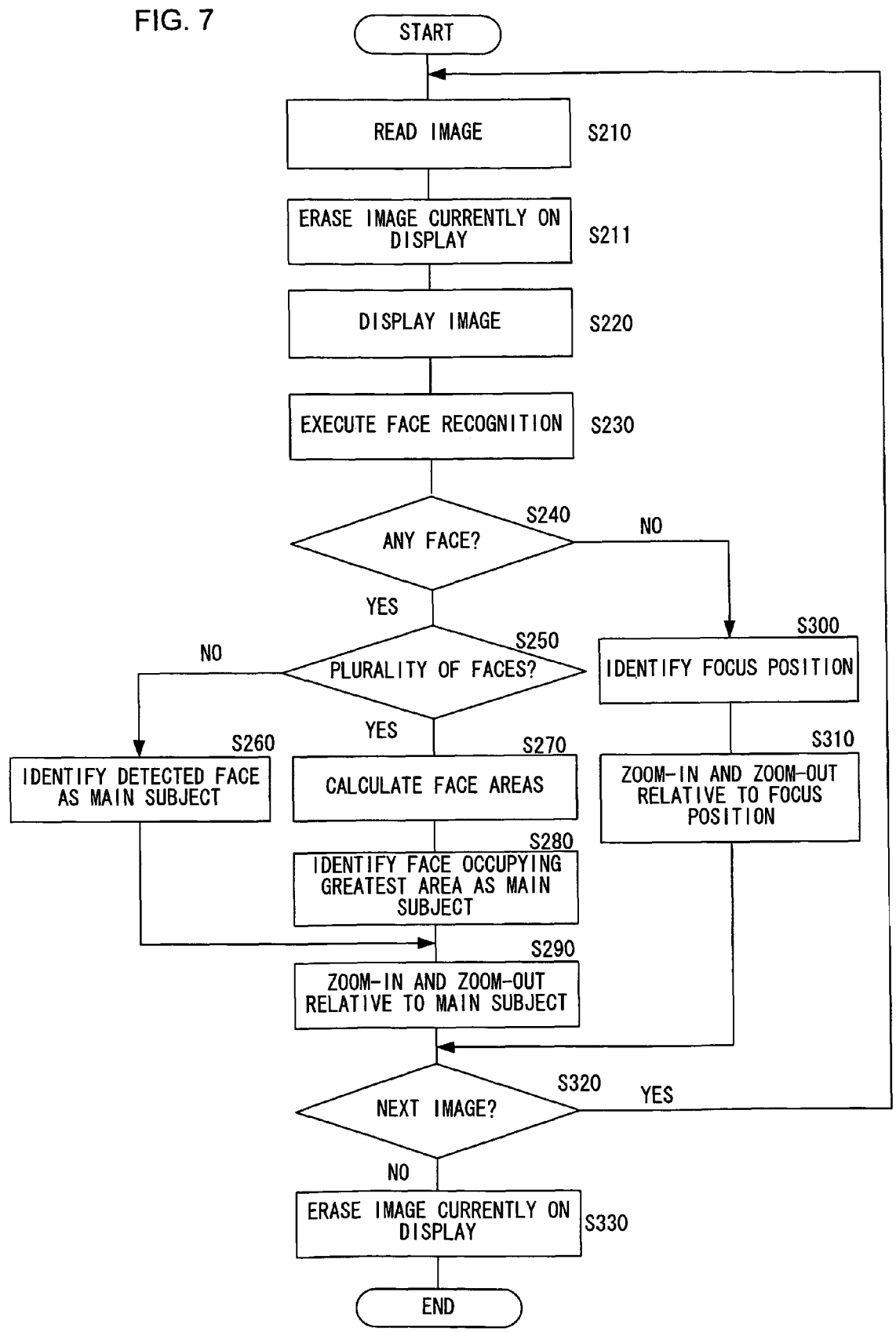
FIG. 7 shows a flowchart of the processing executed in conformance with the image reproduction program achieved in the third embodiment.

FIG. 7 presents a flowchart of the processing executed in conformance to the image reproduction program achieved in the third embodiment. The processing in FIG. 7 is executed by the CPU 103 as the user operates the input device 102 to issue an instruction for slide show execution.

In step S210, image data are read from the HDD 104, and then the operation proceeds to step S211. If an image is currently on display at the monitor 105, the preset display time period allocated for each image is allowed to elapse and then the image is cleared from the monitor 105 to clear the display at the monitor 105 in step S211. Subsequently, the operation proceeds to step S220 to display the image having been read at the monitor 105 before the operation proceeds to step S230. In step S230, the person's face recognition processing is executed on the image on display at the monitor 105 to detect the faces of persons present in the image.

The operation then proceeds to step S240 to make a decision as to whether or not a person's face has been detected in the image. If it is decided that no face has been detected in the image, the operation proceeds to step S300 to ascertain the focus position in the image based upon the image information, as in the second embodiment, before the operation proceeds to step S310. In step S310, the main subject is first displayed in an enlargement by zooming in relative to the subject present at the ascertained focus position and then the initial display state is restored through a zoom-out, before the operation proceeds to step S320, which is to be detailed later. If, on the other hand, it is decided that a face has been detected in the image, the operation proceeds to step S250.

In step S250, a decision is made as to whether or not a plurality of faces has been detected in the image. If it is decided that a plurality of faces has not been detected in the image, i.e., if it is decided that only one face has been detected, the operation proceeds to step S260 to identify the detected face as the main subject. If, on the other hand, it is decided that a plurality of faces has been detected in the image, the operation proceeds to step S270. In step S270, the areas occupied in the image by the individual faces having been detected are calculated and then the operation proceeds to step S280 to identify the person's face occupying the greatest area in the image as the main subject. Subsequently, the operation proceeds to step S290.

In step S290, the main subject is displayed in an enlargement by zooming in relative to the person's face having been identified as the main subject and then the initial display state is restored through a zoom-out. The operation then proceeds to step S320 to make a decision as to whether or not there is an image to be displayed next. If it is decided that there is another image to be displayed, the operation returns to step S210 to execute the processing described above for the next image. If, on the other hand, it is decided that there are no more images to be displayed, the operation proceeds to step S330. In step S330, the image currently on display at the monitor 105 is erased after the preset display time period allocated for each image elapses, and then the processing ends.

The following advantages are achieved in the third embodiment explained above.

(1) The person's face recognition processing is executed on the image on display at the monitor 105, the person's face of a person detected in the image is identified as the main subject and the image is displayed by zooming in and/or zooming out relative to the ascertained main subject. As a result, the main subject can be displayed in an enlargement by appropriately identifying the main subject, i.e., the person's face of a person present in the image.

(2) If a plurality of faces is detected in the image, the person's face taking up the greatest area in the image is identified as the main subject. This feature makes it possible to appropriately identify the main subject since the main subject normally occupies a large area in the captured image.

(3) In addition, unlike in a slide show in the related art in which still images are simply displayed in sequence, images can be displayed with motion, which the user is bound to find more engaging.

Fourth Embodiment

In reference to the fourth embodiment, a method for identifying the main subject in an image based upon the distance information corresponding to various areas in the image, which is included in image information such as Exif information as image capturing conditions under which the image is captured, is explained.

While a detailed explanation of the distance information included in the Exif information, which is of the known art, is not provided, the distance information, each set thereof indicating the distance to a subject photographed in one of a plurality of areas of a predetermined size obtained by dividing the entire image and generated when the shutter button is pressed all the way down, is stored in units of the individual areas. It is to be noted that since a block diagram of the image reproduction apparatus 100 will be similar to that for the image reproduction apparatus achieved in the first embodiment explained in reference to FIG. 1, its explanation is omitted.

The CPU 103 obtains the distance information by reading the Exif information for the image currently on display at the monitor 105. Based upon the distance information thus obtained, an area in the image, containing the subject present at the smallest distance, is ascertained. Namely, the area containing the closest subject present in the image is detected. Then, the subject present inside the ascertained area is identified as the main subject. It is to be noted that while the main subject is judged to be present in the area containing the closest subject in the image in this embodiment, the main subject may instead be judged to be present in the area containing the farthest subject in the image.

Then, as in the second and third embodiments, a zoom-in and/or a zoom-out is executed relative to the identified main subject as the image display effect.

In reference to the flowchart of the processing executed in conformance to the image reproduction program achieved in the second embodiment, which is presented in FIG. 5, the processing executed in conformance to the image reproduction program achieved in the fourth embodiment is explained.

It is to be noted that an explanation of steps in which processing identical to that executed in the second embodiment is executed is omitted and the following explanation focuses on the differences.

In step S130, the area containing a subject at the smallest distance in the image is detected based upon the distance information included in the Exif information for the image and the subject present in the detected area is identified as the main subject.

In the fourth embodiment explained above, based upon the distance information included in the Exif information for the image, the area containing a subject at the smallest distance in the image is detected and the subject present in the area is identified as the main subject. Then, a zoom-in and/or a zoom-out is executed relative to the ascertained main subject. Since the main subject in a given image is highly likely to be the closest under normal circumstances, this embodiment allows the main subject to be identified appropriately for enlarged display.

Fifth Embodiment

A method for identifying the main subject in an image based upon the distance information indicating the distance at the focus position measured when the shutter button is pressed halfway down, which can be obtained from the Exif information, and the distance information each set thereof corresponding to one of the individual areas in the image and generated when the shutter button is pressed all the way down, which can be obtained from the Exif information as has been explained in reference to the fourth embodiment, is explained in reference to the fifth embodiment. It is to be noted that since a block diagram of the image reproduction apparatus 100 will be similar to that for the image reproduction apparatus achieved in the first embodiment having been explained in reference to FIG. 1, its explanation is omitted.

The distance information indicating the distance at the focus position measured when the shutter button is pressed halfway down is stored as part of the Exif information. The CPU 103 compares the distance at the focus position measured when the shutter button was pressed halfway down, which is obtained from the Exif information, and the distances to the various areas photographed in the image, which are obtained from the Exif information, and identifies the area in the image with the smallest distance difference. Then, it judges that the main subject is present in the area and identifies the subject present in the area as the main subject.

For instance, if the user shifts the camera position and presses the shutter button all the way down while the AF point is locked after pressing the shutter button halfway down during an image capturing operation, the main subject may not necessarily be present at the focus position stored in memory as part of the Exif information. By adopting the embodiment, it is possible to identify the subject that the user originally wishes to capture in an image as the main subject even under such circumstances.

Then, a zoom-in and/or a zoom-out is executed relative to the main subject thus ascertained as the image display effect, as in the second through fourth embodiments.

In reference to the flowchart of the processing executed in conformance to the image reproduction program achieved in the second embodiment, which is presented in FIG. 5, the processing executed in conformance to the image reproduction program achieved in the fifth embodiment is explained. It is to be noted that an explanation of steps in which processing identical to that executed in the second embodiment is executed is omitted and the following explanation focuses on the differences.

In step S130, the distance information indicating the distance at the focus position measured when the shutter button was pressed halfway down and the distance information indicating the distances to the individual areas in the image and generated when the shutter button was pressed all the way down are obtained from the Exif information for the image. Then, the area in the image manifesting the smallest difference relative to the distance at the focus position measured when the shutter button was pressed halfway down is ascertained and a subject present in this area is identified as the main subject.

In the fifth embodiment explained above, the area in the image manifesting the smallest difference relative to the distance at the focus position measured when the shutter button was pressed halfway down is ascertained, a subject present inside this area is identified as the main subject and a zoom-in and/or zoom-out is executed relative to the ascertained main subject. Although the main subject is not always present at the focus position stored as part of the Exif information, particularly if the user shifts the camera while the AF point is locked during an image capturing operation, the embodiment enables identification of the subject an image of which the user originally wished to capture as the main subject even under such circumstances.

Sixth Embodiment

By taking into consideration the high likelihood of a subject carrying information that indicates a geographical point at which the image is captured, such as a sign photographed in the image, being the main subject of the image if it is captured at a sightseeing spot or the like, alphanumeric characters photographed in the image is extracted and the characters identified as the main subject in the sixth embodiment. It is to be noted that since a block diagram of the image reproduction apparatus 100 will be similar to that of the image reproduction apparatus achieved in the first embodiment having been explained in reference to FIG. 1, its explanation is omitted.

The CPU 103 recognizes characters in the image through character recognition processing of the known art by adopting a character recognition method used in, for instance, OCR software. It then identifies the characters as the main subject. If a plurality of characters are recognized, the largest character among them is identified as the main subject. In addition, if the sizes of the plurality of characters are all equal, the character present at the lowest position in the image is identified as the main subject.

Then, a zoom-in and/or a zoom-out is executed relative to the main subject thus ascertained as the image display effect, as in the second through fifth embodiments.

In reference to the flowchart of the processing executed in conformance to the image reproduction program achieved in the second embodiment, which is presented in FIG. 5, the processing executed in conformance to the image reproduction program achieved in the sixth embodiment is explained. It is to be noted that an explanation of steps in which processing identical to that executed in the second embodiment is executed is omitted and the following explanation focuses on the differences.

In step S130, character recognition processing of the known art is executed as described above to detect characters in the image and the characters thus detected are identified as the main subject.

In the sixth embodiment described above, a character present in the image is detected, the detected character is identified as the main subject and a zoom-in and/or a zoom-out is executed relative to the main subject. By taking into consideration the high likelihood of a subject carrying information indicating the geographical location at which the image was captured, such as a sign photographed in the image, being the main subject of the image if it was captured at a tourist attraction or the like, the main subject is ascertained appropriately for enlarged display.

Seventh Embodiment

In reference to the seventh embodiment, a method for identifying the main subject of the image in correspondence to the scene mode (photographing mode) set at the camera when the image is captured, which is included in the Exif information for the image as an image capturing condition under which the image is captured is explained. It is to be noted that since a block diagram of the image reproduction apparatus 100 will be similar to that of the image reproduction apparatus achieved in the first embodiment having been explained in reference to FIG. 1, its explanation is omitted.

The CPU 103 reads the Exif information for the image currently on display at the monitor 105 and obtains scene mode information. The scene mode information indicates a specific scene mode setting selected at the camera for the image capturing operation. The term "scene mode" refers to a mode setting that can be selected in a standard digital camera, and may be, for instance, a portrait mode or a sports mode.

Based upon the scene mode information having been read, the CPU 103 identifies the main subject in the image. An explanation is given below on an example in which the scene mode setting selected for the image capturing operation is judged to be the portrait mode based upon the scene mode information. The characteristics of the portrait mode indicate that when this mode is selected as the scene mode, a person is likely to be the main subject. Accordingly, face recognition processing is executed to detect the person's face of a person present in the image, as has been described in reference to the third embodiment. Then, the person's face of the person thus detected is identified as the main subject.

When the sports mode is selected as the scene mode, too, it is highly likely that the main subject is a person engaged in a sport and accordingly, the person's face of a person present in the image may be identified as the main subject. It is to be noted that a human shape instead of the person's face of a person may be recognized to identify the body of the person as the main subject.

Then, a zoom-in and/or a zoom-out is executed relative to the main subject thus ascertained as the image display effect, as in the second through sixth embodiments. For instance, if a person's face is identified as the main subject, a zoom-in relative to the person's face 6a having been identified as the main subject is executed as in the third embodiment explained in reference to FIGS. 6A and 6B.

In reference to the flowchart of the processing executed in conformance to the image reproduction program achieved in the second embodiment, which is presented in FIG. 5, the processing executed in conformance to the image reproduction program achieved in the seventh embodiment is explained. It is to be noted that an explanation of steps in which processing identical to that executed in the second embodiment is executed is omitted and the following explanation focuses on the differences.

In step S130, the scene mode set at the camera for the image capturing operation is determined based upon the Exif information for the image, as described earlier. Then, the main subject of the image is ascertained in correspondence to the scene mode.

In the seventh embodiment explained above, the main subject is ascertained based upon the scene mode setting selected at the camera for the image capturing operation and a zoom-in and/or a zoom-out is executed relative to the main subject. As a result, the main subject can be ascertained with a high degree of accuracy based upon the scene mode indicated in the image data by taking into consideration the fact that different types of photographic subjects are selected as main subjects in different scene modes.

Eighth Embodiment

In reference to the eighth embodiment, a method for identifying the main subject of an image based upon an image title included in the Exif information for the image is explained. The image title can be entered by the user via an input member mounted at the camera, the image reproduction apparatus or the like, either at the time of the image capturing operation or after the image capturing operation. Once the user appends a title to the image, the camera, the image reproduction apparatus or the like is able to store the title as part of the Exif information. It is to be noted that since a block diagram of the image reproduction apparatus 100 will be similar to that of the image reproduction apparatus achieved in the first embodiment having been explained in reference to FIG. 1, its explanation is omitted.

The CPU 103 reads the Exif information for the image currently on display at the monitor 105 and obtains the image title. Then, it extracts a noun contained in the image title. A noun contained in the image title can be extracted by preparing in advance a database having stored therein noun keywords at the HDD 104, executing matching processing for the words contained in the image title and the keywords in the database and extracting a noun achieving a match with a keyword or a noun similar to a keyword.

Next, a decision is made as to whether or not a subject matching the extracted noun is present in the image. For instance, if the title of the image is "clear blue sky", the noun "sky" is extracted and accordingly, extraction of an image area containing sky in the image is attempted through a method of the known art. If the sky is extracted from the image as a result, the sky is identified as the main subject.

Then, a zoom-in and/or a zoom-out is executed relative to the main subject thus ascertained as the image display effect, as in the second through seventh embodiments.

In reference to the flowchart of the processing executed in conformance to the image reproduction program achieved in the second embodiment, which is presented in FIG. 5, the processing executed in conformance to the image reproduction program achieved in the eighth embodiment is explained. It is to be noted that an explanation of steps in which processing identical to that executed in the second embodiment is executed is omitted and the following explanation focuses on the differences.

In step S130, the image title is extracted from the Exif information for the image as described earlier. Then, a noun contained in the title is extracted and a subject present in the image which matches the noun, is identified as the main subject.

In the eighth embodiment explained above, a noun contained in the image title is extracted, a subject present in the image which matches the noun is identified as the main subject and a zoom-in and/or a zoom-out is executed relative to the main subject. As a result, the main subject of the image can be accurately ascertained by taking into consideration the likelihood of the image title containing information related to the main subject.

EXAMPLES OF VARIATIONS

It is to be noted that possible variations include the following.

(1) While an explanation is given above in reference to the first embodiment on an example in which the image reproduction apparatus 100 includes the memory card slot 101 through which image data are taken in, the present invention is not limited to this example, and the image reproduction apparatus 100 may instead include a USB interface that will enable an image intake from a device connected thereto via a USB cable or another type of interface.

(2) In the first embodiment explained earlier, when detecting the directionality of a subject present in the image, the spatial frequency is calculated by executing a two-dimensional Fourier transform over the entirety of the target image, the direction along which the power spectrum is concentrated at the highest level is detected and the subject present in the image is judged to have directionality along this direction. However, the present invention is not limited to this example and the vertical edges and horizontal edges may be extracted through edge extraction processing executed on the target image and the directionality of the subject present in the image may be determined by measuring the detection frequencies of the vertical and horizontal edges. Alternatively, the directionality of the subject in the image may be determined by adopting another algorithm.

(3) In addition, while the two-dimensional Fourier transform is executed over the entire target image, the two-dimensional Fourier transform may instead be executed around the focus position in the image ascertained based upon image information such as Exif information. In this case, the processing speed can be improved by limiting the two-dimensional Fourier transform range to an area around the focus position at which the main subject in the image is normally present.

(4) If the results of the directionality detection processing indicate dispersal of the power spectrum along multiple directions and thus, the directionality of the subject present in the particular image cannot be determined, the image is shifted along the predetermined direction for display in the first embodiment. Instead, the image may be shifted randomly along either the horizontal direction or the vertical direction for display.

(5) In the first embodiment explained above, the directionality of the subject present in the image is judged to be either vertical or horizontal and the image is shifted along the vertical direction or the horizontal direction for display during the slide show. However, the apparatus may be enabled to detect diagonal directionality of the subject present in an image, and in such a case, an image containing a subject with diagonal directionality can be shifted along the diagonal direction for display during the slide show.

(6) In the third embodiment, if a plurality of faces are detected in an image, the areas taken up by all the faces having been detected in the image are calculated and the person's face taking up the greatest area is identified as the main subject. Instead, the focus position may be ascertained based upon the image information and the person's face of a person present the closest to the ascertained focus position may be identified as the main subject. In such a case, the main subject can be ascertained with even more accuracy since the person's face of the person who is the main subject in the image is likely to be present at the focus position.

(7) In addition, image data obtained by capturing an image of the person's face of the person to be identified as the main subject may be saved in advance into the HDD 104, and if a plurality of faces is subsequently detected in an image, the face matching the face of the person to be identified as the main subject, the image data of which are saved in advance, may be identified as the main subject. In this case, whenever a plurality of faces is detected in an image, the same person can be always be identified as the main subject.

(8) While an explanation is given above in reference to the first through third embodiments on an example in which images saved in the HDD 104 are displayed in a slide show, the present invention is not limited to this example and it may be adopted when displaying the individual images, one at a time, in response to a user instruction.

Figure 8:
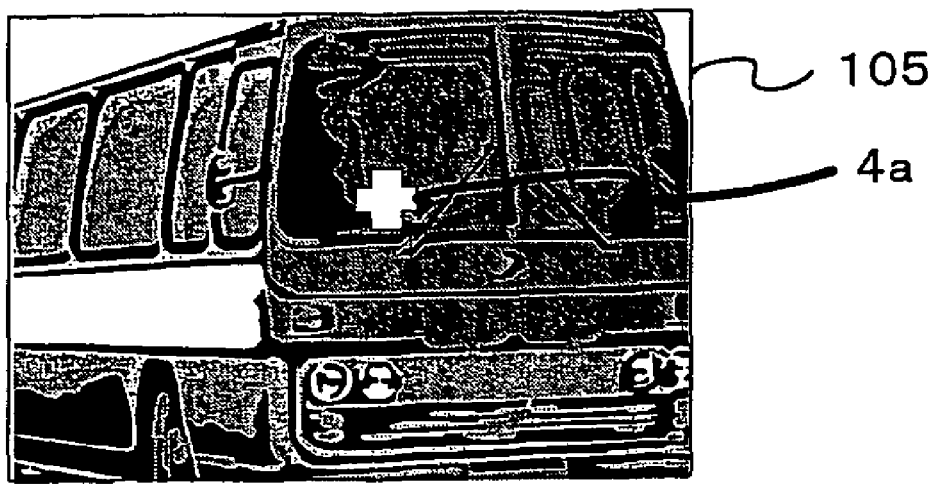
FIGS. 8A and 8B show a specific example in which zoom-in and zoom-out are executed relative to the focus position of a shifting image display based upon the directionality of the subject present in the image.
Figure 8:
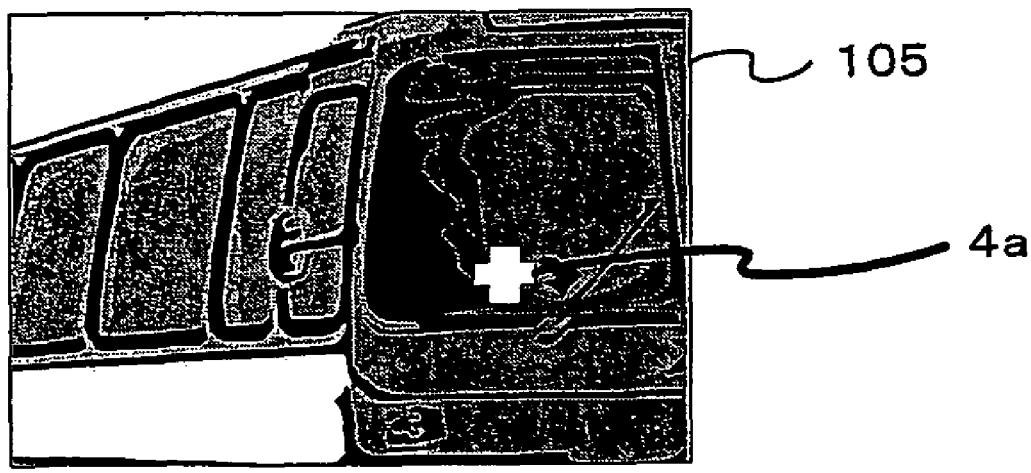

(9) Images may be displayed by adopting the first embodiment in combination with one of the subsequent embodiments, the second-through eighth embodiments. For instance, as shown in FIG. 8A, an image may be shifted and displayed based upon the directionality of a subject present in the image through the processing explained earlier in reference to the first embodiment and then the image may be displayed by zooming in and/or zooming out relative to the main subject ascertained through the method explained in reference to any of the second through eighth embodiments as shown in FIG. 8B. In other words, the detected directionality is horizontal and the photograph is displayed on the screen as it is shifted along the horizontal direction, as shown in FIG. 8A. At the same time, the windshield at which the focus position is located is identified as the main subject and the image around the focus position is enlarged, as shown in FIG. 8B. Since images can be displayed with even more motion in this manner, image viewing will become even more engaging to the user.

(10) In addition, a specific method among the various methods explained in reference to the second through eighth embodiments may be selected as the main subject identification method in correspondence to a given image for display. For instance, if the results of image analysis indicates that a character is contained in the image, the main subject should be ascertained through the method explained in reference to the sixth embodiment, whereas if no characters are contained, another main subject identification method that allows main subject identification without requiring the presence of any characters in the image, such as the method explained in reference to the second embodiment, should be used to identify the main subject.

(11) While images are displayed by zooming in and zooming out in the second and third embodiments explained earlier, images may instead be displayed by either zooming in or zooming out alone.

(12) The image reproduction apparatus according to each of the above embodiments may be realized by a personal computer in which each of the above image reproduction programs is executed.

Figure 9:
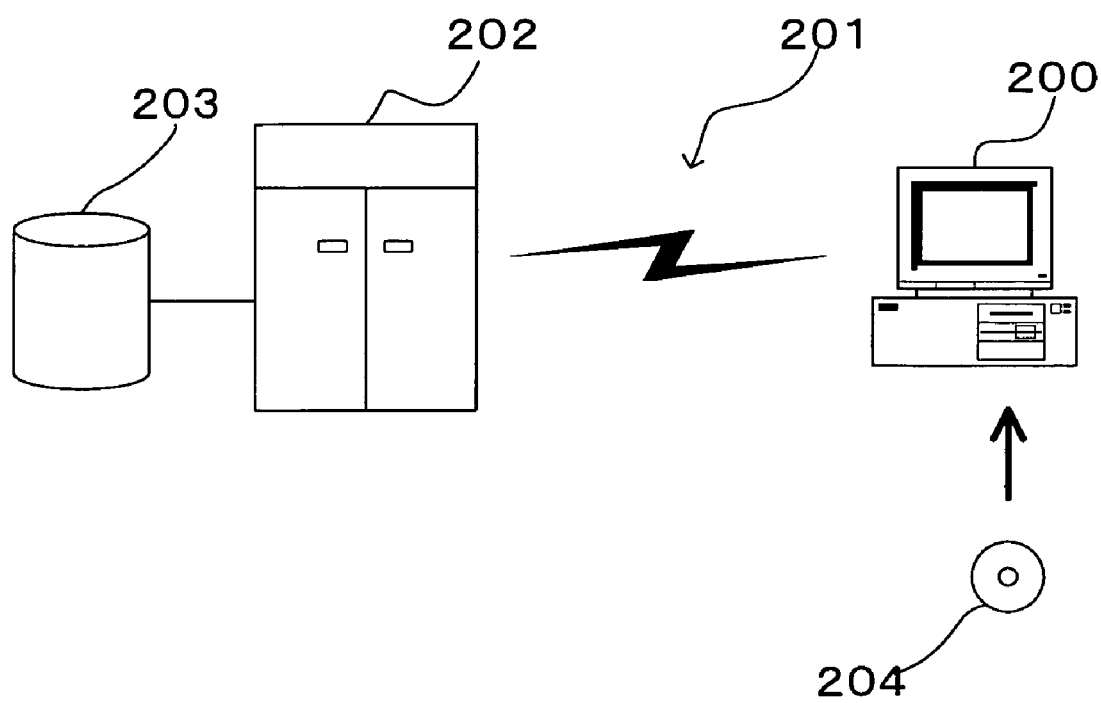
FIG. 9 shows how the image reproduction program is provided to a personal computer.

The image reproduction program executed on the personal computer may be provided in a recording medium such as a CD-ROM or as a data signal on the Internet or the like. FIG. 9 shows how the program may be provided through such media. A personal computer 200 receives the program via a CD-ROM 204.

In addition, the personal computer 200 has a function which enables it to achieve a connection with a communication line 201. A computer 202 is a server computer that provides the program stored in a recording medium such as a hard disk 203. The communication line 201 may be a communication line for Internet communication, personal computer communication or the like, or it may be a dedicated communication line. The computer 202 reads out the program from the hard disk 203 and transmits the program to the personal computer 200 via the communication line 201. Namely, the program embodied as a data signal on a carrier wave is transmitted via the communication line 201. Thus, the program can be distributed as a computer-readable computer program product adopting any of various modes such as a recording medium and a carrier wave.

The above described embodiments are examples, and various modifications can be made without departing from the spirit and scope of the invention.

What is claimed is:

1. An image reproduction apparatus that sequentially reproduces and displays a plurality of images of a slideshow, the apparatus comprising:
   a display effect setting unit that analyzes with image processing image data of one of the plurality of images of the slideshow stored in a storage device to set a display effect of the one of the plurality of images of the slideshow, the display effect setting the one of the plurality of images in motion on display; and
   a display unit that reproduces and displays the one of the plurality of images in motion with the display effect set by the display effect setting unit when sequentially reproducing and displaying the plurality of images of the slideshow, wherein:
   the display effect setting unit comprises:
   a directionality judging unit that judges directionality of a subject present in the one of the plurality of images, the directionality judging unit judging the directionality of the subject present in the one of the plurality of images based on a number and a direction of edges within the one of the plurality of images, and
     a shifting direction setting unit that sets a shifting direction along which the one of the plurality of images is to be shifted for reproduced image display based upon the directionality of the subject present in the one of the plurality of images judged by the directionality judging unit; and
   the display effect setting unit selects as the display effect for the one of the plurality of images a shifting image display achieved by shifting the one of the plurality of images along the shifting direction set by the shifting direction setting unit.

2. The image reproduction apparatus of claim 1, wherein the one of the plurality of images comprises a number of horizontal edges and a number of vertical edges, the directionality being judged based on whether the number of horizontal edges is greater than a number of vertical edges.

3. An image reproduction apparatus that sequentially reproduces and displays a plurality of images of a slideshow, the apparatus comprising:
   a display effect setting unit that analyzes with image processing image data of one of the plurality of images of the slideshow stored in a storage device to set a display effect of the one of the plurality of images of the slideshow, the display effect setting the one of the plurality of images in motion on display; and
   a display unit that reproduces and displays the one of the plurality of images in motion with the display effect set by the display effect setting unit when sequentially reproducing and displaying the plurality of images of the slideshow, wherein:

the display effect setting unit comprises a main subject identifying unit that detects a person's face present in the one of the plurality of images and identifies the person's face as a main subject;

the display effect setting unit selects as the display effect for the one of the plurality of images zoom-in and/or zoom-out relative to the main subject identified by the main subject identifying unit; and the main subject identifying unit detects a plurality of faces in the one of the plurality of images and calculates an area occupied by each of the faces, the greatest area of the calculated areas being identified as the main subject.

4. An image reproduction apparatus that sequentially reproduces and displays a plurality of images of a slideshow, the apparatus comprising:

a display effect setting unit that analyzes with image processing image data of one of the plurality of images of the slideshow stored in a storage device to set a display effect of the one of the plurality of images of the slideshow, the display effect setting the one of the plurality of images in motion on display; and a display unit that reproduces and displays the one of the plurality of images in motion with the display effect set by the display effect setting unit when sequentially reproducing and displaying the plurality of images of the slideshow, wherein:

the display effect setting unit comprises a main subject identifying unit that detects an alphanumeric character present in the one of the plurality of images and identifying the alphanumeric character as a main subject; and the display effect setting unit selects as the display effect for the one of the plurality of images zoom-in and/or zoom-out relative to the main subject identified by the main subject identifying unit.

5. The image reproduction apparatus of claim 4, wherein the main subject identifying unit detects the alphanumeric character by optical character recognition.

6. The image reproduction apparatus of claim 4, wherein the main subject identifying unit detects a plurality of alphanumeric characters in the one of the plurality of images and calculates a size of each character, a largest character being identified as the main subject.

7. An image reproduction apparatus that sequentially reproduces and displays a plurality of images of a slideshow, the apparatus comprising:

a display effect setting unit that sets a display effect of the one of the plurality of images of the slideshow, the display effect setting the one of the plurality of images in motion on display; and a display unit that reproduces and displays the one of the plurality of images in motion with the display effect set by the display effect setting unit when sequentially reproducing and displaying the plurality of images of the slideshow, wherein the display effect setting unit comprises a main subject identifying unit that detects a main subject from a title of the one of the plurality of images; and the display effect setting unit selects as the display effect for the one of the plurality of images zoom-in and/or zoom-out relative to the main subject identified by the main subject identifying unit.

8. An image reproduction apparatus that sequentially reproduces and displays a plurality of images of a slideshow, the apparatus comprising:

a display effect setting unit that sets a display effect of the one of the plurality of images of the slideshow, the display effect setting the one of the plurality of images in motion on display; and a display unit that reproduces and displays the one of the plurality of images in motion with the display effect set by the display effect setting unit when sequentially reproducing and displaying the plurality of images of the slideshow, wherein:

the display effect setting unit comprises a main subject identifying unit that detects a distance from a focus point of a camera that captured the one of the plurality of images to areas containing objects present in the one of the plurality of images and identifies an area containing an object closest to the camera as a main subject; and the display effect setting unit selects as the display effect for the one of the plurality of images zoom-in and/or zoom-out relative to the main subject identified by the main subject identifying unit.

9. An image reproduction apparatus that sequentially reproduces and displays a plurality of images of a slideshow, the apparatus comprising:

a display effect setting unit that sets a display effect of the one of the plurality of images of the slideshow, the display effect setting the one of the plurality of images in motion on display; and a display unit that reproduces and displays the one of the plurality of images in motion with the display effect set by the display effect setting unit when sequentially reproducing and displaying the plurality of images of the slideshow, wherein:

the display effect setting unit comprises a main subject identifying unit that detects a first distance from a camera that captured the one of the plurality of images to a focus position of the camera when a shutter button is pressed half way down and a second distance from the camera to areas containing objects present in the one of the plurality of images when the shutter button is pressed completely down and identifies an area containing an object at a second distance closest to the focus position as a main subject such that a difference between the first distance and the second distance is minimized; and the display effect setting unit selects as the display effect for the one of the plurality of images zoom-in and/or zoom-out relative to the main subject identified by the main subject identifying unit.

10. A non-transitory computer readable storage medium that stores instructions for controlling an image reproduction apparatus that sequentially reproduces and displays a plurality of images of a slideshow, the instructions comprising:

setting a display effect by analyzing, with image processing, image data of one of the plurality of images of the slideshow stored in a storage device to set a display effect of the one of the plurality of images of the slideshow, the display effect setting the one of the plurality of images in motion on display; and reproducing and displaying the one of the plurality of images in motion with the display effect set when sequentially reproducing and displaying the plurality of images of the slideshow, wherein:

the setting the display effect comprises:

judging directionality of a subject present in the one of the plurality of images based on a number and a direction of edges within the one of the plurality of images, and setting a shifting direction along which the one of the plurality of images is to be shifted for reproduced image display based upon the directionality of the subject present in the one of the plurality of images the directionality judged; and the display effect is selected as the display effect for the one of the plurality of images by selecting a shifting image display achieved by shifting the one of the plurality of images along the shifting direction set by the setting the shifting direction.

11. A non-transitory computer readable storage medium that stores instructions for controlling an image reproduction apparatus that sequentially reproduces and displays a plurality of images of a slideshow, the instructions comprising:

setting a display effect by analyzing, with image processing, image data of one of the plurality of images of the slideshow stored in a storage device to set a display effect of the one of the plurality of images of the slideshow, the display effect setting the one of the plurality of images in motion on display; and reproducing and displaying the one of the plurality of images in motion with the display effect set when sequentially reproducing and displaying the plurality of images of the slideshow, wherein:

the setting the display effect comprises:

identifying a main subject by detecting a person's face present in the one of the plurality of images and identifying the person's face as the main subject;

selecting as the display effect for the one of the plurality of images zoom-in and/or zoom-out relative to the main subject identified; and the identifying the main subject includes detecting a plurality of faces in the one of the plurality of images and calculating an area occupied by each of the faces, the greatest area of the calculated areas being identified as the main subject.

12. A non-transitory computer readable storage medium that stores instructions for controlling an image reproduction apparatus that sequentially reproduces and displays a plurality of images of a slideshow, the instructions comprising:

setting a display effect by analyzing, with image processing, image data of one of the plurality of images of the slideshow stored in a storage device to set a display effect of the one of the plurality of images of the slideshow, the display effect setting the one of the plurality of images in motion on display; and reproducing and displaying the one of the plurality of images in motion with the display effect set when sequentially reproducing and displaying the plurality of images of the slideshow, wherein:

the setting the display effect comprises:

identifying a main subject by detecting an alphanumeric character present in the one of the plurality of images and identifying the alphanumeric character as a main subject; and selecting as the display effect for the one of the plurality of images zoom-in and/or zoom-out relative to the main subject identified.

13. A non-transitory computer readable storage medium that stores instructions for controlling an image reproduction apparatus that sequentially reproduces and displays a plurality of images of a slideshow, the instructions comprising:

setting a display effect of the one of the plurality of images of the slideshow by setting the one of the plurality of images in motion on display; and reproducing and displaying the one of the plurality of images in motion with the display effect set when sequentially reproducing and displaying the plurality of images of the slideshow, wherein the setting the display effect comprises:

identifying a main subject by detecting a main subject from a title of the one of the plurality of images; and selecting as the display effect for the one of the plurality of images zoom-in and/or zoom-out relative to the main subject identified by the main subject identifying unit.

14. A non-transitory computer readable storage medium that stores instructions for controlling an image reproduction apparatus that sequentially reproduces and displays a plurality of images of a slideshow, the instructions comprising:

setting a display effect of the one of the plurality of images of the slideshow by setting the one of the plurality of images in motion on display; and reproducing and displaying the one of the plurality of images in motion with the display effect set when sequentially reproducing and displaying the plurality of images of the slideshow, wherein:

the setting the display effect comprises:

identifying a main subject by detecting a distance from a focus point of a camera that captured the one of the plurality of images to areas containing objects present in the one of the plurality of images and identifying an area containing an object closest to the camera as a main subject; and selecting as the display effect for the one of the plurality of images zoom-in and/or zoom-out relative to the main subject identified.

15. A non-transitory computer readable storage medium that stores instructions for controlling an image reproduction apparatus that sequentially reproduces and displays a plurality of images of a slideshow, the instructions comprising:

setting a display effect of the one of the plurality of images of the slideshow by setting the one of the plurality of images in motion on display; and reproducing and displaying the one of the plurality of images in motion with the display effect set when sequentially reproducing and displaying the plurality of images of the slideshow, wherein:

the setting the display effect comprises:

identifying a main subject by detecting a first distance from a camera that captured the one of the plurality of images to a focus position of the camera when a shutter button is pressed half way down and a second distance from the camera to areas containing objects present in the one of the plurality of images when the shutter button is pressed completely down and identifying an area containing an object at a second distance closest to the focus position as a main subject such that a difference between the first distance and the second distance is minimized; and selecting as the display effect for the one of the plurality of images zoom-in and/or zoom-out relative to the main subject identified.

* * * * *